(12) United States Patent
Topham

(10) Patent No.: US 7,512,771 B2
(45) Date of Patent: *Mar. 31, 2009

(54) MAPPING CIRCUITRY AND METHOD COMPRISING FIRST AND SECOND CANDIDATE OUTPUT VALUE PRODUCING UNITS, AN IN-RANGE VALUE DETERMINING UNIT, AND AN OUTPUT VALUE SELECTION UNIT

(75) Inventor: Nigel Peter Topham, Wokingham (GB)

(73) Assignee: Altera Corporation, San Jose, CA (US)

( * ) Notice: Subject to any disclaimer, the term of this patent is extended or adjusted under 35 U.S.C. 154(b) by 791 days.

This patent is subject to a terminal disclaimer.

(21) Appl. No.: 10/780,083

(22) Filed: Feb. 17, 2004

(65) Prior Publication Data

US 2004/0162920 A1  Aug. 19, 2004

Related U.S. Application Data

(63) Continuation of application No. 09/785,877, filed on Feb. 16, 2001, now Pat. No. 6,754,806.

(51) Int. Cl.
*G06F 7/00* (2006.01)
(52) U.S. Cl. .................................... 712/220
(58) Field of Classification Search ................ 712/220
See application file for complete search history.

(56) References Cited

U.S. PATENT DOCUMENTS

| 4,445,138 | A | 4/1984 | Zwirn et al. ............... 358/166 |
|---|---|---|---|
| 4,555,703 | A | 11/1985 | Cantrell .................... 343/5 SA |
| 4,709,326 | A | 11/1987 | Robinson .................... 364/200 |
| 4,800,302 | A | 1/1989 | Marum ....................... 307/441 |
| 4,800,524 | A * | 1/1989 | Roesgen ..................... 711/217 |
| 5,381,360 | A | 1/1995 | Shridhar et al. ............. 364/746 |
| 5,983,333 | A | 11/1999 | Kolagotla et al. ........... 711/219 |
| 6,073,228 | A * | 6/2000 | Holmqvist et al. .......... 711/217 |
| 6,204,780 | B1 | 3/2001 | Cole .......................... 341/50 |

FOREIGN PATENT DOCUMENTS

| EP | 0 676 691 | 10/1995 |
|---|---|---|
| GB | 2 263 565 | 7/1993 |
| GB | 2 340 271 | 2/2000 |
| WO | 92/08186 | 5/1992 |
| WO | 98/12625 | 3/1998 |

* cited by examiner

*Primary Examiner*—Eric Coleman
(74) *Attorney, Agent, or Firm*—Greer, Burns & Crain, Ltd.

(57) ABSTRACT

Mapping circuitry (40) comprises a first candidate output value producing unit (42) which produces a first candidate output value (C1) that differs by a first offset value (x) from a received input value (r). During operation of the first candidate output value producing unit (42) a second candidate output value producing unit (44) produces a second candidate output value (C2) that differs by a second offset value (y) from the received input value (r). One of the first and second candidate output values is within a preselected range of allowable output values and the other is outside that range. An in-range value determining unit (46) determines which one of the first and second candidate output values is within the range, and an output value selection unit (48) selects this value as the output value (p) corresponding to the received input value (r).

24 Claims, 12 Drawing Sheets

| Stage | Cycle | Issue slot 1 | Issue slot 2 | Issue slot 3 | v0 | v1 | v2 | v3 |
|---|---|---|---|---|---|---|---|---|
| 1 | 0 | ld v0, (r0++) | | | s0 | | | |
| | 1 | | | | s0 | | | |
| 2 | 2 | ld v2, (r2++) | | mul v1, v0, r1 | s1 | s2 | | |
| | 3 | | | | | s2 | s4 | |
| 3 | 4 | | | | | s3 | s5 | |
| | 5 | | | add v3, v1, v2 | | s3 | s5 | s6 |
| 4 | 6 | | | | | | | s7 |
| | 7 | | | | | | | s7 |
| 5 | 8 | | st v3, (r3++) | | | | | s8 |
| | 9 | | | | | | | s8 |

| Cycle | Offset | Iteration 0 | | | | | Instruction | Iteration 1 | | | |
|---|---|---|---|---|---|---|---|---|---|---|---|
| | | Instruction | v0 | v1 | v2 | v3 | | v0 | v1 | v2 | v3 |
| 0 | 6 | ld v0, (r0++) | r4 (→ p10) | | | | | | | | |
| 1 | 6 | | r4 (→ p10) | | | | | | | | |
| 2 | 5 | mul v1, v0, r1 | r5 (→ p10) | r6 (→ p11) | | | ld v0, (r0++) | r4 (→ p9) | | | |
| 3 | 5 | ld v2, (r2++) | | r6 (→ p11) | r8 (→ p13) | | | r4 (→ p9) | | | |
| 4 | 4 | | | r7 (→ p11) | r9 (→ p13) | | mul v1, v0, r1 | r5 (→ p9) | r6 (→ p10) | | |
| 5 | 4 | add v3, v1, v2 | | r7 (→ p11) | r9 (→ p13) | r10 (→ p14) | ld v2, (r2++) | | r6 (→ p10) | r8 (→ p12) | |
| 6 | 3 | | | | | r11 (→ p14) | | | r7 (→ p10) | r9 (→ p12) | |
| 7 | 3 | | | | | r11 (→ p14) | add v3, v1, v2 | | r7 (→ p10) | r9 (→ p12) | r10 (→ p13) |
| 8 | 2 | | | | | r12 (→ p14) | | | | | r11 (→ p13) |
| 9 | 2 | st v3, (r3++) | | | | r12 (→ p14) | | | | | r11 (→ p13) |
| 10 | 1 | | | | | | | | | | r12 (→ p13) |
| 11 | 1 | | | | | | st v3, (r3++) | | | | r12 (→ p13) |

| Cycle | Offset | Iteration 0 Instruction | v0 | v1 | v2 | v3 | Iteration 1 Instruction | v0 | v1 | v2 | v3 |
|---|---|---|---|---|---|---|---|---|---|---|---|
| 0 | 6 | | | | | | | | | | |
| 1 | 6 | | | | | | | | | | |
| 2 | 5 | | | | | | | | | | |
| 3 | 5 | | | | | | | | | | |
| 4 | 4 | ld v0, (r0++) | r4 (→ p8) | | | | | | | | |
| 5 | 4 | | r4 (→ p8) | | | | | | | | |
| 6 | 3 | mul v1, v0, r1 | r5 (→ p8) | r6 (→ p9) | | | ld v0, (r0++) | r4 (→ p7) | | | |
| 7 | 3 | ld v2, (r2++) | | r6 (→ p9) | r8 (→ p11) | | | r4 (→ p7) | | | |
| 8 | 2 | | | r7 (→ p9) | r9 (→ p11) | | mul v1, v0, r1 | r5 (→ p7) | r6 (→ p8) | | |
| 9 | 2 | add v3, v1, v2 | | r7 (→ p9) | r9 (→ p11) | r10 (→ p12) | ld v2, (r2++) | | r6 (→ p8) | r8 (→ p10) | |
| 10 | 1 | | | | | r11 (→ p12) | | | r7 (→ p8) | r9 (→ p10) | |
| 11 | 1 | | | | | r11 (→ p12) | add v3, v1, v2 | | r7 (→ p8) | r9 (→ p10) | r10 (→ p11) |
| 12 | 0 | | | | | r12 (→ p12) | | | | | r11 (→ p11) |
| 13 | 0 | st v3, (r3++) | | | | r12 (→ p12) | | | | | r11 (→ p11) |
| 14 | -1 | | | | | | | | | | r12 (→ p11) |
| 15 | -1 | | | | | | st v3, (r3++) | | | | r12 (→ p11) |

Fig.6(B)

| Cycle | Offset | Iteration 0 Instruction | Iteration 1 Instruction | Iteration 2 Instruction | Iteration 3 Instruction |
|---|---|---|---|---|---|
| 0 | 6 | ld r4, (r0++) | | | |
| 1 | 6 | | | | |
| 2 | 5 | mul r6, r5, r1 | ld r4, (r0++) | | |
| 3 | 5 | ld r8, (r2++) | | | |
| 4 | 4 | | mul r6, r5, r1 | ld r4, (r0++) | |
| 5 | 4 | add r10, r7, r9 | ld r8, (r2++) | | |
| 6 | 3 | | | mul r6, r5, r1 | ld r4, (r0++) |
| 7 | 3 | | add r10, r7, r9 | ld r8, (r2++) | |
| 8 | 2 | | | | mul r6, r5, r1 |
| 9 | 2 | st r14, (r3++) | | add r10, r7, r9 | ld r8, (r2++) |
| 10 | 1 | | | | |
| 11 | 1 | | st r12, (r3++) | | add r10, r7, r9 |
| 12 | 0 | | | | |
| 13 | 0 | | | st r12, (r3++) | |
| 14 | -1 | | | | |
| 15 | -1 | | | | st r12, (r3++) |

Fig.7

| Cycle | Offset | Iteration 0<br>Instruction | Iteration 1<br>Instruction | Iteration 2<br>Instruction | Iteration 3<br>Instruction |
|---|---|---|---|---|---|
| 0 | 6 | ld p10, (p0++) | | | |
| 1 | 6 | | | | |
| 2 | 5 | mul p11, p10, p1 | ld p9, (p0++) | | |
| 3 | 5 | ld p13, (p2++) | | | |
| 4 | 4 | | mul p10, p9, p1 | ld p8, (p0++) | |
| 5 | 4 | add p14, p11, p13 | ld p12, (p2++) | | |
| 6 | 3 | | | mul p9, p8, p1 | ld p7, (p0++) |
| 7 | 3 | | add p13, p10, p12 | ld p11, (p2++) | |
| 8 | 2 | | | | mul p8, p7, p1 |
| 9 | 2 | st p14, (p3++) | | add p12, p9, p11 | ld p10, (p2++) |
| 10 | 1 | | | | |
| 11 | 1 | | st p13, (p3++) | | add p11, p8, p10 |
| 12 | 0 | | | | |
| 13 | 0 | | | st p12, (p3++) | |
| 14 | -1 | | | | |
| 15 | -1 | | | | st p11, (p3++) |

Fig.8

MAPPING CIRCUITRY AND METHOD COMPRISING FIRST AND SECOND CANDIDATE OUTPUT VALUE PRODUCING UNITS, AN IN-RANGE VALUE DETERMINING UNIT, AND AN OUTPUT VALUE SELECTION UNIT

This is a continuation of application Ser. No. 09/785,877, filed Feb. 16, 2001 now U.S. Pat. No. 6,754,806.

BACKGROUND OF THE INVENTION

1. Field of the Invention

The present invention relates to circuitry and a method for performing a fast mapping from an input value to an output value. The present invention can be applied to register renaming in pipelined loops in a microprocessor.

2. Description of the Related Art

In high performance computing, the requirement for cyclic register renaming arises in the context of software-pipelined loops, where a high rate of instruction execution is usually required of the target machine (e.g. microprocessor). Execution time is often dominated by loop structures within the application program. To permit a high rate of instruction execution a processor may include a plurality of individual execution units, with each individual unit being capable of executing one or more instructions in parallel with the execution of instructions by the other execution units.

Such a plurality of execution units can be used to provide a so-called software pipeline made up of a plurality of individual stages. Each software pipeline stage has no fixed physical correspondence to particular execution units. Rather, when a loop structure in an application program is compiled the machine instructions which make up an individual iteration of the loop are scheduled for execution by the different execution units in accordance with a software pipeline schedule. This schedule is divided up into successive stages and the instructions are scheduled in such a way as to permit a plurality of iterations to be carried out in overlapping manner by the different execution units with a selected loop initiation interval between the initiations of successive iterations. Thus, when a first stage of an iteration i terminates and that iteration enters a second stage, execution of the next iteration i+1 is initiated in a first stage of the iteration i+1. Thus, instructions in the first stage of iteration i+1 are executed in parallel with execution of instructions in the second stage of iteration i.

In such software-pipelined loops there are typically several iterations of a loop in a partial state of completion at each moment. Hence, there may be several live copies of each value computed within the loop. To distinguish between these values, and to identify them relative to the current iteration, requires that the name of each value held in a register must change at well-defined moments during loop execution. These renaming points are known by the compiler, which also determines the register name required within each instruction to access each value depending on the iteration in which it was computed.

The name of a value held in a register is known to the programmer or compiler in terms of the register identifiers within each assembly-code instruction. The purpose of static register renaming is to define a scheme whereby these identifiers are translated at run-time into actual register numbers based on a translation scheme that can be predicted by the programmer or compiler.

For example, if a value X is assigned to register r1 in iteration 1, a typical renaming scheme would make that value available in register r2 in iteration 2 and in register r3 in iteration 3, and so on. It is the responsibility of the compiler or programmer to allocate register identifiers to each value in a way that ensures correct operation of the loop.

In software pipelined loops there are usually loop-variant values, i.e. expressions which must be reevaluated in each different iteration of the loop, that must be communicated between different instructions in the pipeline. To deal with such loop-variant values it is possible to store them in a so-called rotating register file. In this case, each loop-variant value is assigned a logical register number within the rotating register file, and this logical register number does not change from one iteration to the next. Inside the rotating register file each logical register number is mapped to a physical register within the register file and this mapping is rotated each time a new iteration is begun, i.e. each time a pipeline boundary is closed. Accordingly, corresponding instructions in different iterations can all refer to the same logical register number, making the compiled instructions simple, whilst avoiding a value produced by one iteration from being overwritten by a subsequently-executed instruction of a different iteration.

With such a register renaming scheme in operation, before an instruction can be executed by the processor it is first necessary, for each register access within a software-pipelined loop, to perform a register mapping process to translate the register identifiers into actual register numbers. This mapping is done at run time and hence places extra time demands on the processor in a highly time-critical activity. It is therefore desirable that the time taken to perform this mapping is as small as possible.

SUMMARY OF THE INVENTION

The present invention can provide mapping circuitry which maps an input value, within a preselected range of allowable input values, to a corresponding output value within a preselected range of allowable output values. A first candidate output value producing unit is connected for receiving the input value and produces a first candidate output value that differs by a first offset value from the received input value. A second candidate output value producing unit is connected for receiving the input value and produces a second candidate output value that differs by a second offset value from the received input value. The first and second offset values are such that a difference between them is equal to a difference between respective output-range limit values defining the limits of the preselected output-value range and also such that, for any input value within the preselected input-value range, one of the first and second candidate output values is within the preselected output-value range and the other of those two values is outside that range. An in-range value determining unit determines which one of the first and second candidate output values is within the preselected output-value range. An output value selection unit selects as the corresponding output value that one of the first and second candidate output values which is determined to be within the output-value range.

In a first aspect of the present invention the second candidate output value producing unit produces the second candidate output value during operation of the first candidate output value producing unit to produce the first candidate output value.

In a second aspect of the present invention the in-range value determining unit determines which one of the first and second candidate output values is within the preselected output-value range during operation of one or both of the first and second candidate value producing units to produce the first and second candidate output values. The first and second aspects can be used together.

According to another aspect of the present invention there is provided a processor which comprises mapping circuitry embodying the above-described first or second aspect of the present invention, and which also comprises: an instruction issuing unit which issues instructions; at least one instruction executing unit which executes the issued instructions; and a register file, having a plurality of physical registers. The mapping circuitry is connected to receive as its input value a logical register identifier specified by one of the instructions, and the output value of the mapping circuitry is a physical register identifier used for identifying one of the physical registers within the register file that corresponds to the specified logical register identifier.

The present invention can also provide a mapping method for mapping an input value, within a preselected range of allowable input values, to a corresponding output value within a preselected range of allowable output values. A first candidate output value is produced that differs by a first offset value from the received input value. A second candidate output value is produced that differs by a second offset value from the received input value. The first and second offset values are such that a difference between them is equal to a difference between respective output-range limit values defining the limits of the preselected output-value range and also such that, for any input value within the the preselected input-value range, one of the first and second candidate output values is within the preselected output-value range and the other of those two values is outside that range. It is determined which one of the first and second candidate output values is within the preselected output-value range. That one of the first and second candidate output values which is determined to be within the output-value range is selected as the corresponding output value.

In one aspect of the method, the second candidate output value is produced during production of the first candidate output value.

In another aspect of the method it is determined, during production of one or both of the first and second candidate output values, which one of the first and second candidate output values is within the preselected output-value range. These two aspects can be used together.

BRIEF DESCRIPTION OF THE DRAWINGS

FIG. 4 is a table showing an instruction schedule obeying the modulo scheduling constraint;

FIGS. 6A and 6B show a table illustrating the relationship between virtual, logical and physical register numbers for several iterations of a loop;

FIG. 7 shows an example sequence of compiled instructions for several iterations of a loop;

FIG. 8 shows an example of the sequences of FIG. 7 after run-time mapping of logical registers to physical registers;

DETAILED DESCRIPTION OF THE PREFERRED EMBODIMENTS

Figure 1:
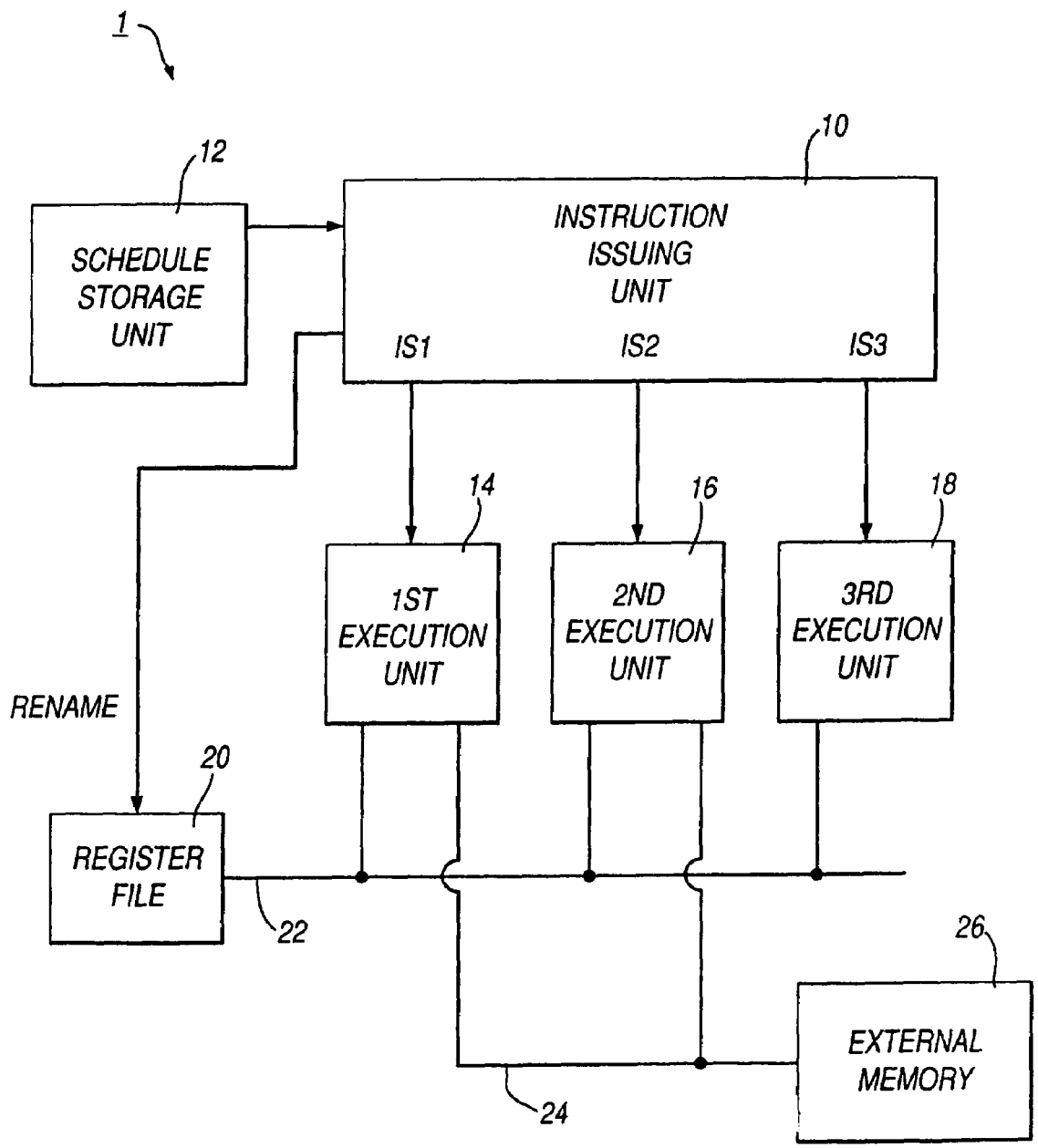
FIG. 1 shows parts of a processor in which mapping circuitry embodying the present invention can be used.

FIG. 1 shows parts of a processor to which an embodiment of the present invention is applicable. In this example, the processor is a very long instruction word (VLIW) processor with hardware support for software pipelining and cyclic register renaming. The processor 1 includes an instruction issuing unit 10, a schedule storage unit 12, respective first, second and third execution units 14, 16 and 18, and a register file 20. The instruction issuing unit 10 has three issues slots IS1, IS2 and IS3 connected respectively to the first, second and third execution units 14, 16 and 18. A first bus 22 connects all three execution units 14, 16 and 18 to the register file 20. A second bus 24 connects the first and second units 14 and 16 (but not the third execution unit 18 in this example) to a memory 26 which, in this example, is an external random access memory (RAM) device. The memory 26 could alternatively be a RAM internal to the processor 1.

Incidentally, although FIG. 1 shows shared buses 22 and 24 connecting the execution units to the register file 20 and memory 26, it will be appreciated that alternatively each execution unit could have its own independent connection to the register file and memory.

The processor 1 performs a series of processing cycles. In each processing cycle the instruction issuing unit 10 can issue one instruction at each of the issue slots IS1 to IS3. The instructions are issued according to a software pipeline schedule (described below) stored in the schedule storage unit 12.

The instructions issued by the instructing issuing unit lo at the different issue slots are executed by the corresponding execution units 14, 16 and 18. In this example each of the execution units can execute more than one instruction at the same time, so that execution of a new instruction can be initiated prior to completion of execution of a previous instruction issued to the execution unit concerned.

To execute instructions, each execution unit 14, 16 and 18 has access to the register file 20 via the first bus 22. Values held in registers contained in the register file 20 can therefore be read and written by the execution units 14, 16 and 18. Also, the first and second execution units 14 and 16 have access via the second bus 24 to the external memory 26 so as to enable values stored in memory locations of the external memory 26 to be read and written as well. The third execution unit 18 does not have access to the external memory 26 and so can only manipulate values contained in the register file 20 in this example.

The concept of register renaming can be illustrated with reference to the FIG. 1 processor by considering the following simple loop, written in the C programming language, which is commonly found in many linear algebra packages:

```
for (i=0; i<m; i++)
    dy(i) = dy(i) + da × dx(i)
```

In this loop, each element dy(i) (i=0, 1, ... m−1) of an array dy is increased by the product of a constant value da and a corresponding element dx(i) of a further array dx.

Figure 2:
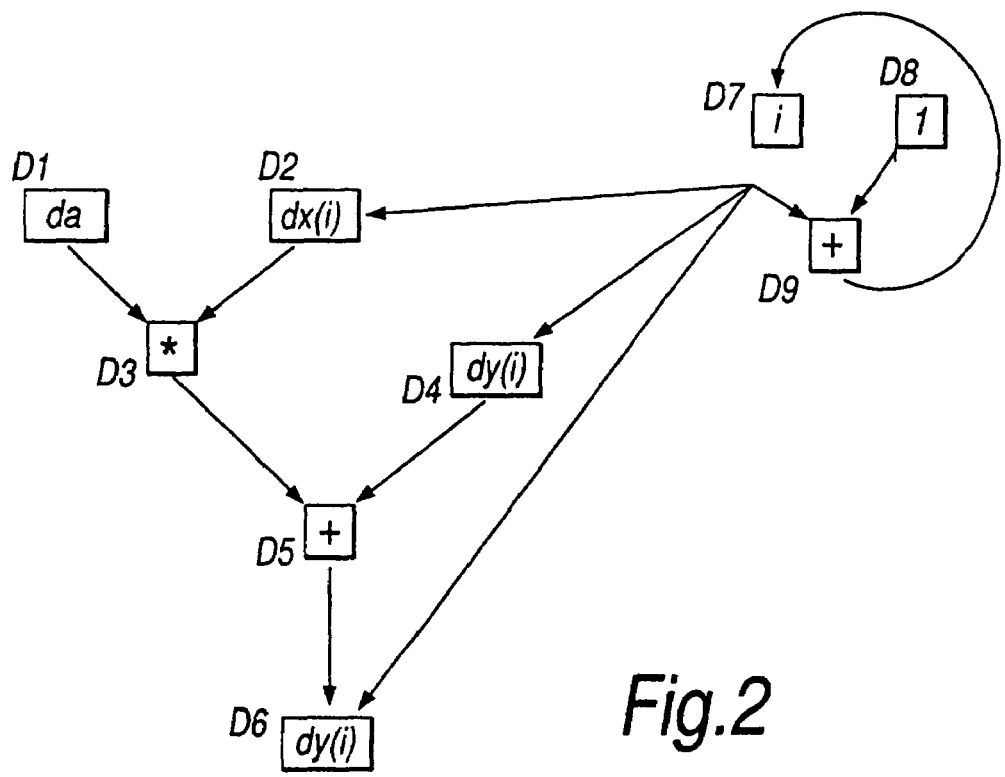
FIG. 2 is an illustration of an example symbolic data-flow graph for a simple instruction loop.

The process of compiling this loop for a very long instruction word (VLIW) processor with hardware support for software pipelining and cyclic register renaming typically begins with the creation of a symbolic data-flow graph, as illustrated in FIG. 2.

The symbolic data-flow graph shows how data, and operators which act upon that data, are utilized during the loop, and is useful for highlighting the time-dependencies within a loop and for determining any time optimizations which can be made to increase the time efficiency of a loop.

For example, the "add" operation in node D5 first requires the value of dy(i) to be accessed (node D4) and the values of da and dx(i) to be accessed (nodes D1 and D2 respectively) and multiplied (node D3). It is apparent that the operations (D1, D2, D3) can be performed at the same time, or overlapping with, the operation D4 such that any values required for operation D5 are ready for use by the start of that operation. The result of the "add" operation in node D5 is subsequently stored in dy(i) in node D5. Nodes D7 to D9 implement the incrementing of the array variable "i" at the end of every iteration.

The arrays dx and dy will be stored in memory locations in the external memory 26 (FIG. 1) and so references to them in the FIG. 1 data-flow graph must be converted into corresponding memory access operations. Thus, each array dx and dy needs at least one pointer for pointing to the storage locations in the external memory 26 where the elements of the array are stored. Each such pointer is held in a register of the register file 20.

Although the constant value da could be dealt with using a similar pointer to its location in the memory, as the value is loop-invariant it is more convenient and fast to keep it directly in its own register of the register file 20 during execution of the loop.

The next step in the process of compiling the example loop shown in the code box above would be to perform a variety of optimisations to convert the data-flow graph shown in FIG. 2 into a form which is closer to actual machine instructions. During this process the compiler would typically determine what values change within the loop and what values remain the same. For example, in this case, the value of "da" is not altered at all during the loop. Array references are converted into pointer accesses, and auto-increment addressing modes are used if the target machine supports such a feature.

Figure 3:
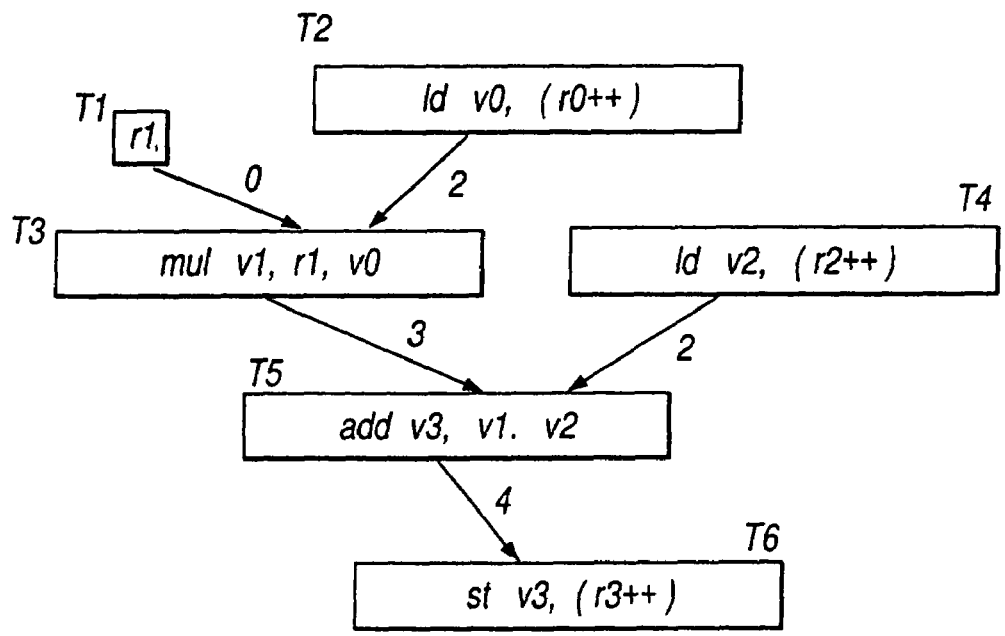
FIG. 3 shows an internal compiler tree-structured representation corresponding to the symbolic data-flow graph of FIG. 2.

The resulting internal tree-structured compiler representation is illustrated in FIG. 3. The illustrated representation shows the individual machine operations T1 to T6, their dependence relationships (as arrows) and attached to each arrow is an integer which represents the number of processor cycles required to complete the operation from which the arrow points. Use is made of registers r0 to r3, as well as virtual registers v0 to v3.

Listed below is a brief explanation of the meaning of each of the machine operations shown in FIG. 2.

ld A, B: load the contents of memory location B into register A.
mul A, B, C: multiply the contents of register B with the contents of register C and store the result in register A.
add A, B, C: add the contents of register B to the contents of register C and store the result in register A.
st A, B: store the contents of register A in memory location B.

Where a register is shown in brackets in FIG. 3, it is the contents of the memory location pointed to by the address stored in that register which is used. The symbol "++" after a register name means that the contents of that register is auto-incremented after it has been used in a particular operation.

Instructions T1 to T6 illustrated in FIG. 3 relate closely to corresponding nodes D1 to D6 of the symbolic data-flow graph illustrated in FIG. 2. Intermediate values are assigned virtual register numbers v0 to v3, whilst other values are assigned register numbers r1 to r3. The virtual register numbers are not the final register assignments but are merely temporary labels for the arrows in the data-flow graph illustrated in FIG. 2 (as will be explained in more detail below).

Listed below is a summary of the use for each register identifier shown in FIG. 3.

r0: pointer to current dx
r1: da
r2: pointer to current dy
r3: pointer to current dy
v0: temporary label for dx
v1: temporary label for da*dx
v2: temporary label for dy
v3: temporary label for dy+da*dx For example, in instruction T2 the contents of the memory location pointed to by register r0 are loaded into register v0 and the value (pointer) stored in register r0 is subsequently incremented. Since the value stored in register r0 is a pointer to the current dx, this represents an access to the value dx(i), which corresponds to node D2 of FIG. 2. Since array references have been converted into pointer accesses, the incrementing of variable i in line 1 of the code box is performed by incrementing the pointer to dx in instruction T2 and the two pointers to dy in instructions T4 and T6.

The longest path between any pair of instructions defines the minimum amount of time required to execute one iteration of the loop. This is known as the "schedule length" and is formally defined as the sum of the latencies along the longest (critical) path plus 1. In this example, therefore, the schedule length is ten cycles. A register which is auto-incremented in one cycle is ready for use again in the next cycle.

All subsequent stages of compilation described here are specific to software pipelining. The first phase of software pipelining is to determine the loop initiation interval (referred to simply as "II"), which is the interval between initiation of successive iterations of the loop. The loop initiation interval depends on the available resources in comparison with the number of instructions to execute, as well as the presence of any cycles in the data-flow graph.

For example, the FIG. 1 processor has three instruction issue slots IS1 to IS3 and three execution units 14, 16 and 18, of which only the first and second execution units 14 and 16 are capable of accessing the external memory 26. It may also be the case that the execution units may be "specialised" units in the sense that they are optimised individually for carrying out different tasks. For example, it may be that only certain of the execution units are capable of performing certain types of instruction.

In the present example, it will be assumed that, taking account of the available resources, the loop initiation interval II is determined as two processor cycles. Also, it will be assumed that only the third execution unit 18 is equipped with the resources (e.g. an arithmetic and logic unit ALU) necessary to execute add and multiply instructions.

The next step is to create a schedule which obeys a so-called modulo scheduling constraint. An example schedule is shown in FIG. 4. In the FIG. 4 schedule the first issue slot handles only "ld" instructions, the second issue slot handles only "st" instructions and the third issue slot handles the arithmetic operators "mul" and "add".

The modulo scheduling constraint specifies that, for each issue slot, an instruction can be scheduled at time i if and only if there are no instructions scheduled at time j such that j modulo II is equal to i. This ensures that, with a new iteration starting every II cycles, there is no possibility that more than one instruction is required to be issued in a particular cycle of a particular issue slot.

The modulo scheduling table shows how the five instructions T2 to T6 making up one iteration of the loop are scheduled. In particular, columns 3 to 5 of the table show the cycle in the schedule when each instruction is issued, the software pipeline stage in which it occurs, and the issue slot by which the instruction is issued (i.e. the execution unit which executes the instruction). The final four columns indicate logical register numbers and shading is used to illustrate value lifetimes, as will be explained later in detail with reference to FIGS. 6 to 8.

As shown in the table, because of the modulo scheduling constraint no two instructions can be scheduled a multiple of two cycles apart in the same issue slot. Thus, once the first load instruction T2 has been scheduled for issue from issue slot 1 in cycle 0, the next instruction, i.e. the multiply instruction T3 which is to be issued in cycle 2, must be scheduled in a different issue slot from issue slot 1, in this case issue slot 3. Issue slot 3 is chosen because only the third execution unit 18 is capable of executing multiply instructions in this example. Similarly, once the second load instruction T4 has been scheduled for issue in cycle 3 from issue slot 1, the next instruction, i.e. the add instruction T5 which is scheduled for issue in cycle 5, must be issued from a different slot from slot 1, in this case again the slot 3. The fifth instruction, which is the store instruction T6, is required to be issued at cycle 9. Because of the modulo constraint, this cannot be issued in either issue slot 1 or issue slot 3, and must accordingly be assigned to issue slot 2.

It should be understood that the schedule in the FIG. 4 table relates to one iteration only. Every II cycles another iteration is initiated according to the same schedule. Thus, when the current iteration is at stage 1, the immediately-preceding iteration will be at stage 2, the iteration before that will be at stage 3, the iteration before that at stage 4 and the iteration before that at stage 5. The instructions are scheduled for issue by the same issue slots in all iterations, that each issue slot issues the same instruction every II cycles.

If the target machine has a set of rotating (logical) registers called s0, s1, s2 up to sr, then these may be allocated in place of the virtual registers as shown in the four right-most columns. It is apparent from FIG. 4 that the register allocated to v0 changes from being s0 in stage 1 to s1 in stage 2. This is because the renaming mechanism effectively shifts the register names by one each time a pipeline boundary is crossed and a new iteration is begun. This allows the value of v0 computed in iteration i to be distinguished from the value of v0 computed in iterations i+1 and i−1.

This places a requirement on the hardware which accesses registers to shift the registers at regular intervals. If the binding between a register name and the register contents is fixed, then the shifting could only be achieved by physically copying si to si+1, for all i in the shifting register file range. This would be prohibitively costly, so instead the binding of register names to register locations can be made to rotate when a shift operation is required. The above-mentioned registers s0 to sr are therefore not the final physical register numbers, but are logical register numbers which are converted (mapped) at run-time to physical register numbers.

Many software pipelined loops also require a number of loop-invariant values to be available in registers. A loop-invariant value is a value which is used inside the loop, but which is never re-computed within the loop. An example is the value "da" in the above example loop. Such values must be stored in registers that do not undergo register renaming during loop execution. The pointers to the arrays dx and dy, although not loop-invariant values, can also be stored in statically-named registers in this example. Consequently, a register file for use in this context will require a renamable portion for holding loop-variant values, and a statically-named portion for holding loop-invariant values and other suitable values.

Figure 5:
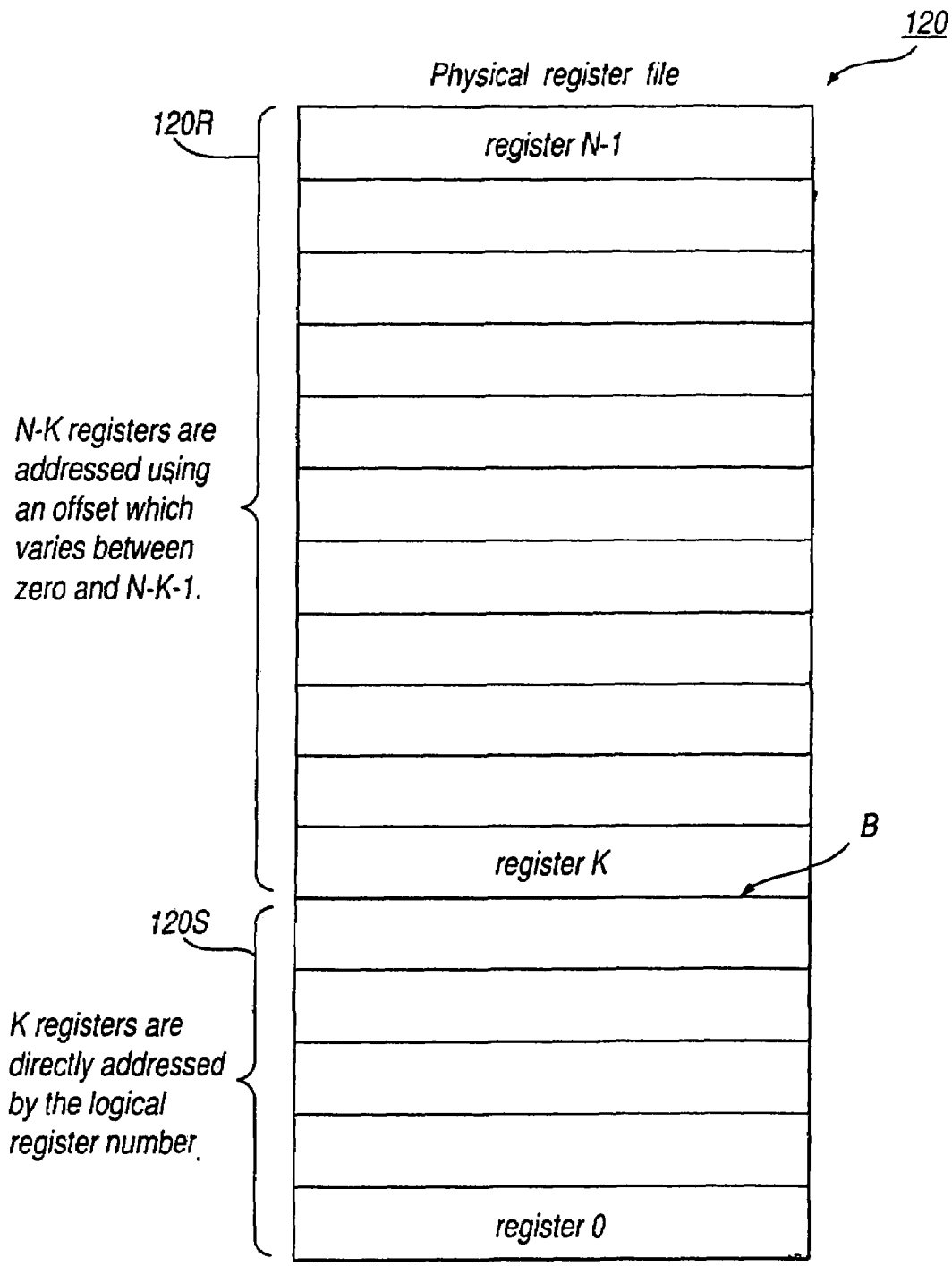
FIG. 5 shows an example register file containing statically and dynamically addressed regions.

One example of such a register file is illustrated in FIG. 5.

The example register file 120 shown in FIG. 5 consists of N registers. Of these, the lower-numbered K are statically named and the higher-numbered N-K are dynamically named (renamable). The statically-named registers make up a statically-named portion 120S of the register file and the renamable registers make up a renamable portion 120R of the register file.

Each instruction specifies its register operands by means of a logical register number. This is an m-bit binary integer in the range 0 to N−1, where m=$\lceil \log_2(N) \rceil$. The FIG. 5 register file requires mapping circuitry that implements a bijective mapping from logical register identifiers (numbers) to physical register identifiers (addresses). Each physical register address P is also an m-bit binary integer in the range 0 to N−1, and identifies directly one of the actual hardware registers.

If an instruction specifies a logical register number R as one of its operands, and R is in the range 0 to K−1 inclusive, then the physical register number is identical to the logical register number of that operand. However, if R is in the range K to N−1 then the logical register number of that operand is given by P such that:

$$P = K + |R - K + \text{OFFSET}|_{N-K}. \quad (1)$$

In this notation, $|y|_x$ means y modulo x. OFFSET is a mapping offset value (integer) which increases (or decreases) monotonically by one whenever the registers are renamed.

This mapping from logical register number R to physical register number P will now be explained in more detail with reference to the table shown in FIGS. 6A and 6B. The table of FIG. 6B is a continuation of the table shown in FIG. 6A. The table shows the register renaming scheme in operation for the same example as described above, with the first two iterations illustrated in FIG. 6A and the next two iterations illustrated in FIG. 6B.

In this example, the value of K is assumed to be equal to four (since there are four statically-named registers r0 to r3). The value of N is assumed to be sufficiently large that it does not affect the progress of the present example. The mapping offset value OFFSET is initialised to the value 6, and is made to decrease by one every time a pipeline boundary is crossed, as shown in the second column of FIGS. 6A and 6B.

The sequence of instructions shown in the first column of iteration 0 of FIG. 6A is the same as the sequence of instructions shown divided into three columns (issue slots 1 to 3) in FIG. 4. The statically-named registers are assigned logical register numbers r0 to r3. The loop-variant registers are given temporary labels v0 to v3. The same set of temporary labels are used for each iteration, so that the first column of each iteration shows the same sequence of instructions, shifted by the iteration interval II (which in this case is two cycles).

On compilation, the temporary virtual register numbers v0 to v3 are converted into logical register numbers, as shown in the corresponding columns headed v0 to v3 within each iteration illustrated in FIGS. 6A and 6B. For example, the virtual register number v0 in cycles 0 and 1 of iteration 0 is assigned, by the compiler, the logical register number r4. At run-time this logical register number is converted to a physical register number by using equation (1) above to map from R to P. In this case, R=4, K=4 and "offset"=6, and therefore the mapped physical register number will be equal to 10. Hence logical register number r4 is mapped at run-time to physical register number p10 in this example.

When a pipeline boundary is crossed, in order to identify the same register after the boundary is crossed the compiler must use a logical register number that is incremented by one compared to the logical register number used before the crossing, so that at run-time, when the mapping is also rotated at each pipeline boundary, the correct physical register will be accessed from one stage to another. For example, considering the virtual register number v0 in iteration 0, when the pipeline boundary is crossed going from cycle 1 to cycle 2, the logical register number is incremented from r4 to r5, so that the same physical register number (p10) is accessed in the second stage, taking into account the fact that OFFSET has decreased to 5.

FIG. 7 shows the result of the allocation of logical register numbers by the compiler for the sequence of instructions for each of the iterations 0 to 3 shown in FIGS. 6A and 6B. FIG. 8 shows the effect of the register mapping which is performed at run-time to map the logical register numbers to physical register numbers.

It can be seen, by considering the physical register numbers allocated to each of the variables labelled v0 to v3 in the table of FIGS. 6A and 6B, that the values of a variable in one iteration can be distinguished from the value of a variable in a neighbouring iteration, since the physical register allocated to that variable is different from one iteration to the next. Correct operation of the pipelined loop is therefore ensured.

Incidentally, with the above-mentioned mapping equation (1) for the mapping from logical register number R to physical register P, when renaming the rotating registers OFFSET may be incremented or it may be decremented. If it is incremented then the logical register number of a particular physical register decreases by one each time OFFSET is incremented. Likewise if OFFSET is decremented the logical register numbers increase.

Figure 9:
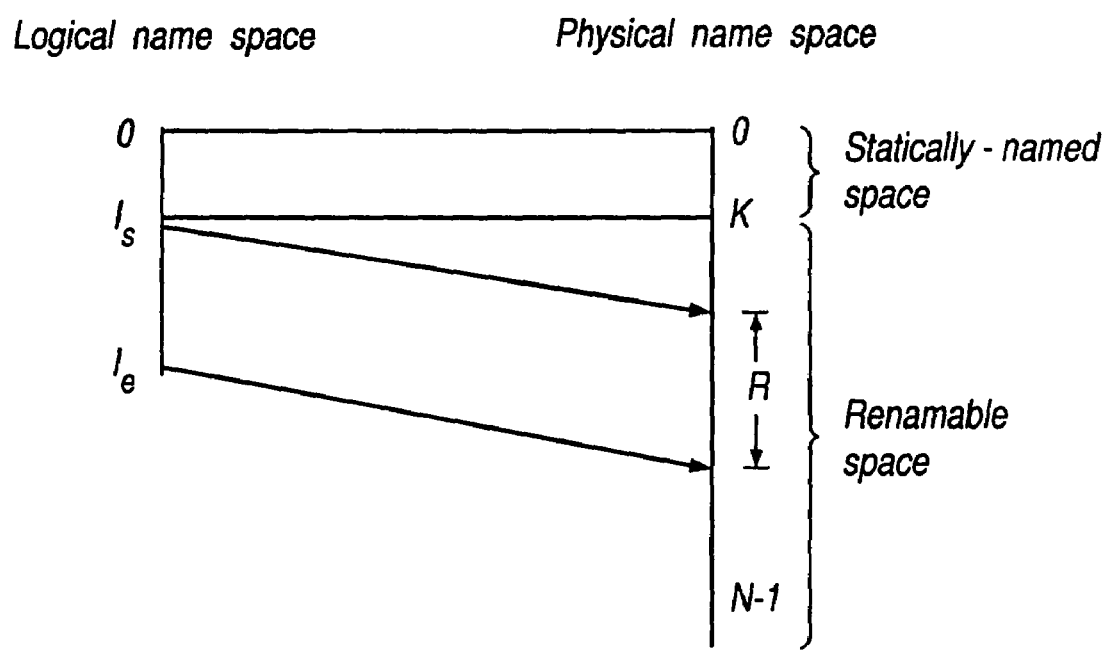
FIG. 9 is a diagram illustrating the mapping between logical and physical register numbers.

The mapping from logical register identifiers to physical register identifiers is illustrated graphically in FIG. 9. There is a direct mapping of logical register numbers in the range 0 to $l_s-1$ to physical register numbers in the statically-named space from 0 to K−1, and consequently K≧$l_s$. If K=$l_s$ the renamable space from K to N−1 (120R in FIG. 5) is contiguous with the statically-named space (120S in FIG. 5), which may be efficient in terms of use of physical registers in the register file. However, the renamable space may be set apart from the statically-named space by setting K>$l_s$. Logical register numbers in the range $l_s$ to $l^e$ map to a region of equal size in the renamable space between K and N−1. The location of this region within the renamable space is varied in accordance with the mapping offset values OFFSET.

The evaluation of P in the mapping equation (1) is performed at run-time and is a time-critical activity within the pipeline of a high-performance processor as it requires a number of integer calculations before each required register can be accessed.

In particular the mapping equation (1) involves a time-consuming modulus operation. Mapping circuitry embodying the present invention is intended to realise a faster implementation of the mapping from logical register numbers to physical register numbers, in particular by avoiding the need for the calculation of a modulus operation.

Figure 10:
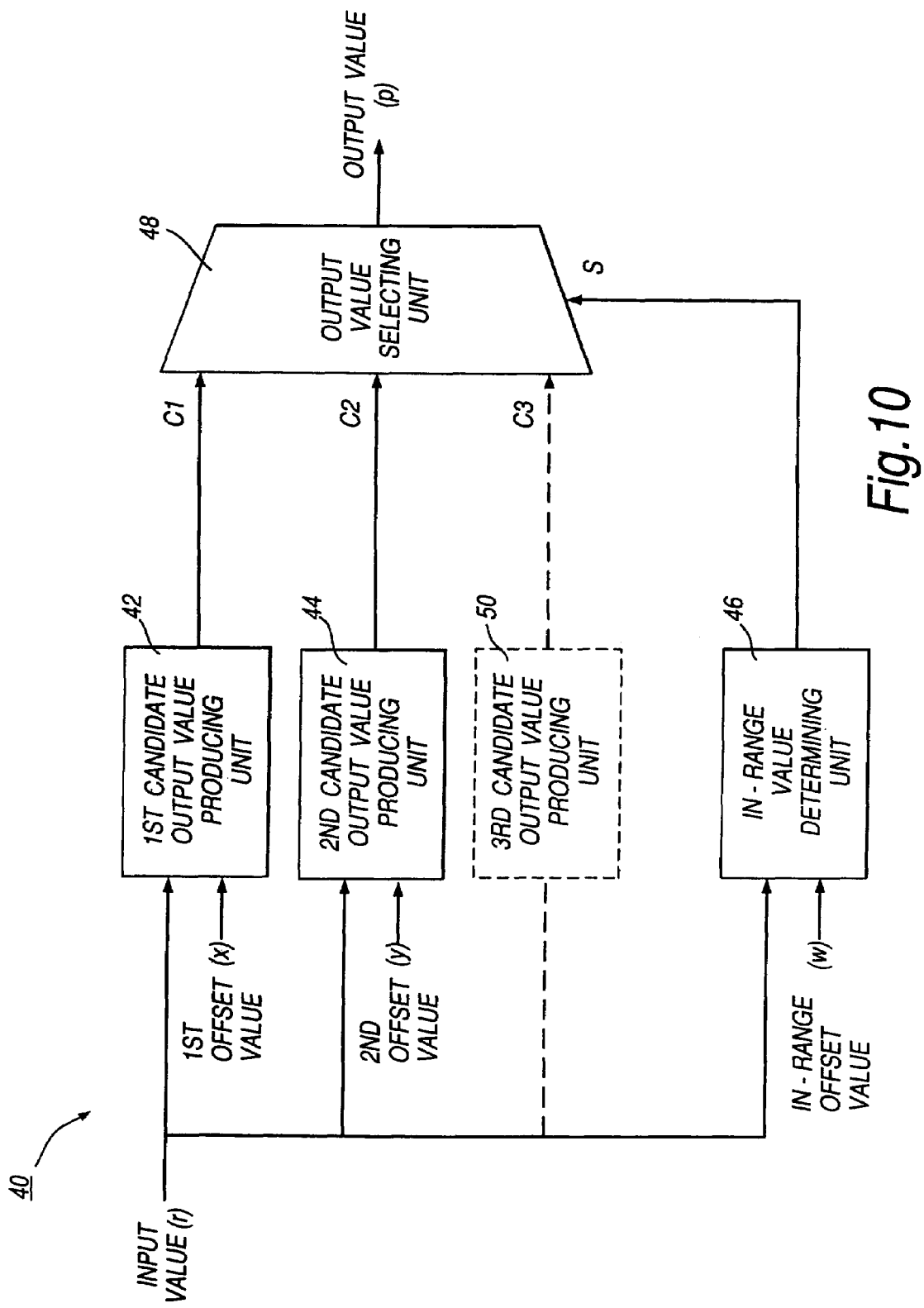
FIG. 10 shows a block diagram of parts of mapping circuitry embodying the present invention.

FIG. 10 shows parts of mapping circuitry embodying the present invention. The mapping circuitry 40 includes respective first and second candidate output value producing units 42 and 44, an in-range value determining unit 46 and an output value selecting unit 48. Optionally, a third candidate output value producing unit 50 may also be provided.

The first and second candidate output value producing units 42 and 44 are each connected for receiving an input value r. The first candidate output value producing unit 42 produces a first candidate output value C1 that differs by a first offset value x from the received input value r. The second candidate output value producing unit 44 produces a second candidate output value C2 that differs by a second offset value y from the received input value r. For example, C1=x+r and C2=y+r. Alternatively, C1=x−r and C2=y−r.

A difference y−x between the first and second offset values is equal to a difference between respective output-range limit values K and N defining the limits of a preselected range of allowable output values p (e.g. from K to N−1) of the mapping circuitry. Furthermore, the first and second offset values x and y are such that, for any input value within a preselected range of allowable input values ($l_s$≦r≦$l_e$), one of the first and second candidate output values C1 and C2 is within the preselected output-value range (K to N−1) and the other of those two values C1 and C2 is outside that range.

The in-range value determining unit 46 determines which one of the first and second candidate output values C1 and C2 is within the preselected output-value range. The output value selecting unit 48 then selects as the output value p corresponding to the received input value r that one of the first and second candidate output values C1 and C2 which is determined to be within the output-value range. For example, the in-range value determining unit 46 applies a selection signal S to the output value selecting unit 48 to indicate the selection to be made by that unit.

In a first aspect of the present invention, during operation of the first candidate output value producing unit 42 to produce the first candidate output value C1, the second candidate output value producing unit 44 operates to produce the second candidate output value C2. This enables the first and second candidate output values C1 and C2 to be available for selection by the output value selecting unit 48 more quickly than if the values were produced sequentially, for example by a single candidate output value producing unit. In this aspect of invention, the in-range value determining unit 46 may examine the produced candidate output values C1 and C2 directly to determine which one of them is in-range.

In a second aspect of the present invention, during operation of one or both of the first and second candidate output value producing units 42 and 44 to produce the first and second candidate output values C1 and C2, the in-range value determining unit 46 operates to determine which one of those candidate output values C1 and C2 will be in-range. In this case, for example, the in-range value determining unit 46 may be connected for receiving the input value r. The in-range value determining unit 46 may also make use of an in-range offset value w which has a known relationship with (e.g. a fixed difference from) each of the first and second offset values x and y. This in-range offset value w is employed with the input value r to make the in-range determination independently of the candidate output values C1 and C2 as produced by the candidate output value producing units 42 and 44. For example, all or part of the selection signal S may be derived by combining the in-range offset value w with the input value r. In the second aspect of the invention, because the in-range value determining unit 46 operates during operation of one or both of the first and second candidate output value producing units 42 and 44, the in-range determination does not have to be deferred until the candidate output values C1 and C2 are actually produced by those units. The first and second candidate output value producing units 42 and 44 do not have to operate at the same time in the second aspect of the invention.

Preferably, the first and second candidate output value producing units 42 and 44 and the in-range value determining unit 46 all operate at the same time so that the selection of the in-range candidate output value C1 or C2 can take place as soon as the candidate output values C1 and C2 are produced by the units 42 and 44.

If the optional third candidate output value producing unit 50 is provided, this produces a third candidate output value C3 which may or may not be dependent on the input value r. For example, the third candidate output value C3 may simply be set equal to the input value r. The value C3 is preferably produced by the unit 50 during operation of one or more of the units 42, 44 and 46.

Figure 11:
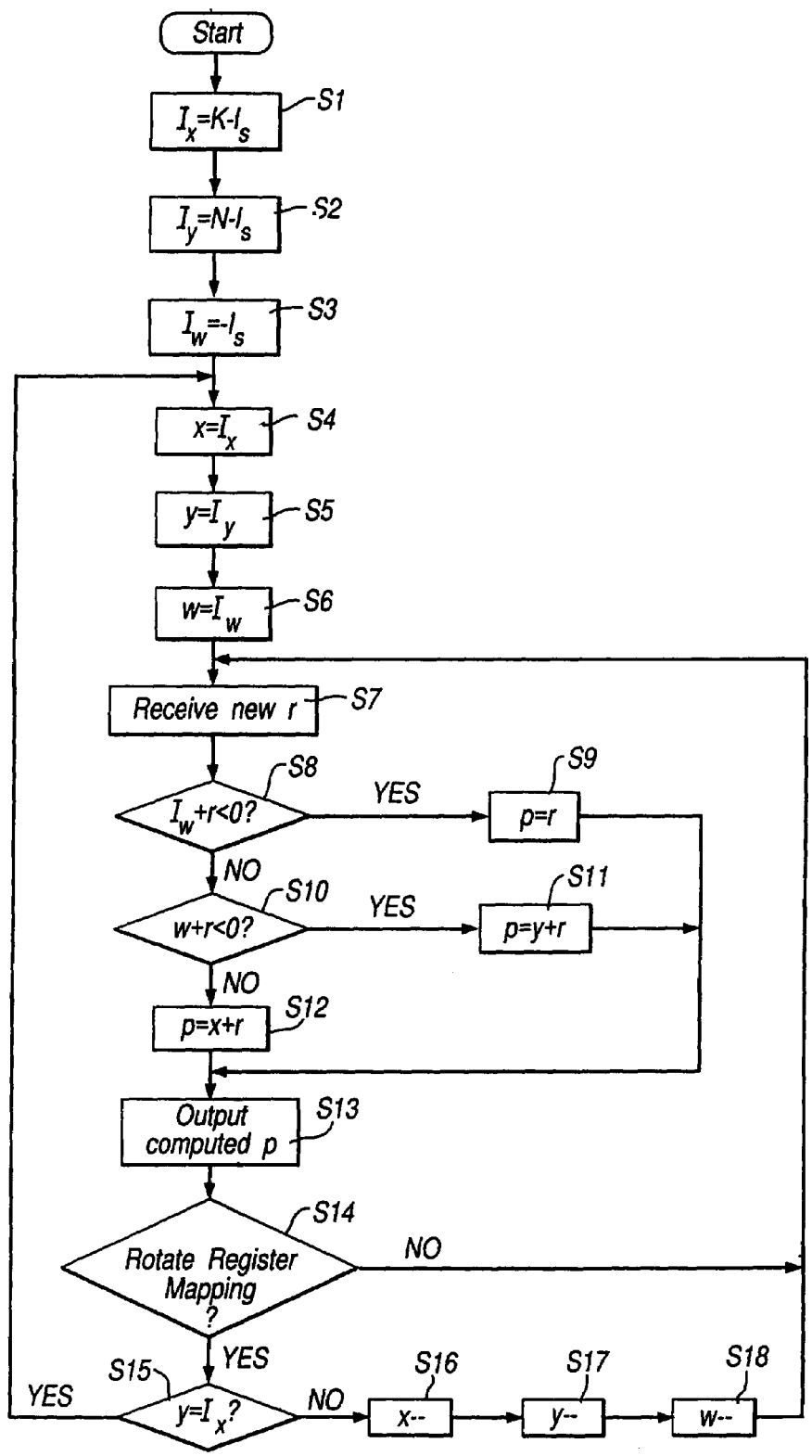
FIG. 11 is a flowchart for use in explaining a mapping method embodying the present invention.

FIG. 11 is a flowchart for use in explaining a method for mapping an input value (logical register number) to a corresponding output value (physical register number) in a preferred embodiment of the present invention. In this method three initialisation values $I_x$, $I_y$ and $I_w$ are used, as follows:

$$I_x = K - l_s$$

$$I_y = N - l_s$$

$$I_w = -l_s$$

These three initialisation values are set in steps S1, S2 and S3 respectively in FIG. 11. In steps S4, S5 and S6, three count values x, y and w are set to the initialisation values $I_x$, $I_y$ and $I_w$ respectively. Referring back to FIG. 10 the count value x represents the first offset value, the count value y represents the second offset value, and the count value w represents the in-range offset value. The settings performed in steps S4 to S6 are repeated occasionally and are referred to collectively as a "reset" operation.

Mapping from a input value r to its corresponding output value p is performed in steps S7 to S13 of FIG. 11. In step S7 a new input value r is received. In step S8 the value of $I_w + r$ is examined. If it is less than 0 (i.e. $r < l_s$) then the output value p is set to r (third candidate output value C3) in step S9, and processing then jumps to step S13. If in step S8 $I_w + r \geq 0$ (i.e. $r \geq l_s$) then the value of w+r is examined in step S10. If the value of w+r is less than 0 then the output value p is set to y+r (second candidate output value C2) in step S11 and processing jumps to step S13. If in step S10 $w + r \geq 0$ then the output value p is set to x+r (first candidate output value C1) in step S12 and processing is continued with step S13. In step S13 the computed output value p is output.

In step S14 it is determined whether the register mapping is to be rotated. This would happen, for example, when a pipeline boundary is encountered and a new iteration is begun. If the register mapping is not to be rotated, then processing returns to step S7 to receive a new input value r to be mapped as before.

If the register mapping is to be rotated then in step S15 it is checked whether $y = I_x$. If so, then processing is returned to step S4, where the "reset" operation (steps S4 to S6) is performed before receipt of the next input value r in step S7. If it is determined in step S15 that y is not equal to $I_x$ then the count values x, y and w are each decremented in steps S16, S17 and S18 respectively and processing is subsequently returned to step S7 to await receipt of a new r-value to be mapped.

In the FIG. 11 method, to achieve a speed advantage the two additions of steps S11 and S12, used to produce the first and second candidate output values C1 and C2, are performed in parallel with one another, and the two comparisons of steps S8 and S10, used to determine which candidate output value C1 to C3 to select, are also performed in parallel with one another. In this way, when the results of the comparisons performed in steps S8 and S10 become available, the results can be used to select the appropriate one of the results of steps S9 (C3), S11 (C2) and S12 (C1) as the output value p to be output in step S13.

Figure 12:
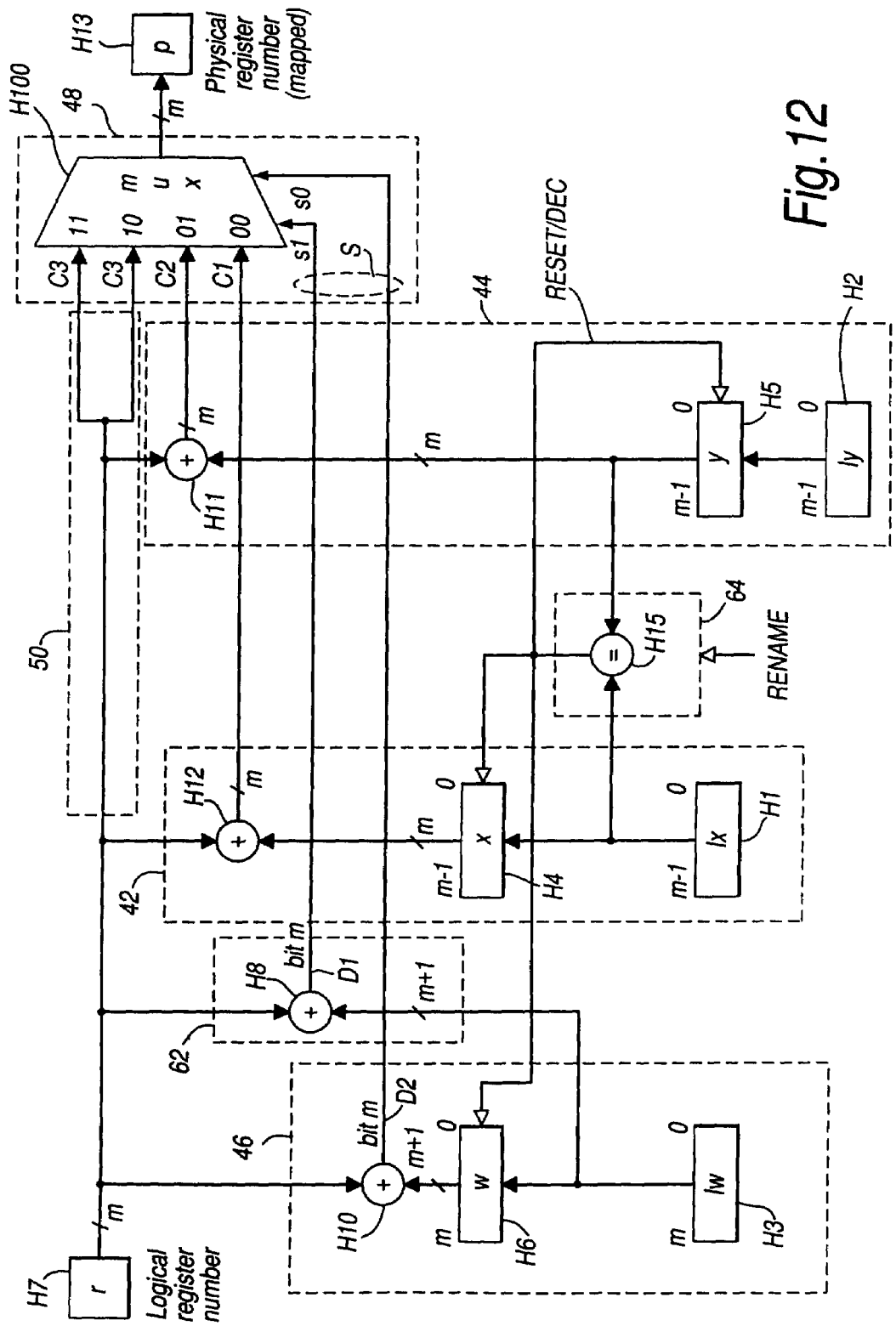
FIG. 12 shows mapping circuitry according to a preferred embodiment of the present invention.

FIG. 12 shows, in register transfer level (RTL) representation, one example of register mapping circuitry according to a preferred embodiment of the present invention. The FIG. 12 circuitry 60 is intended to perform the method illustrated in FIG. 11, and in FIG. 12 the reference numerals H4 to H13 assigned to the elements of the mapping circuitry are intended to assist in an understanding of the correspondence between those elements and the steps S4 to S13 in FIG. 11.

The mapping circuitry 60 has an input H7 for receiving an m-bit input value (logical register number) r and an output H13 for outputting an m-bit output value (mapped physical register number) p corresponding to the input value r. For example, m=5 or 6. The circuitry also contains four adders H8, H10, H11 and H12, three registers H1, H2 and H3, three counters H4, H5 and H6, a comparator H15 and a multiplexer H100.

As shown in FIG. 12, the adder H12, the counter H4 and the register H1 together correspond to the first candidate output value producing unit 42 in FIG. 8. The adder H11, the counter H5 and the register H2 together correspond to the second candidate output value producing unit 44. The adder H10, the counter H6 and the register H3 together correspond to the in-range determining unit 46. The multiplexer H100 corresponds to the output value selecting unit 48. The adder H8 is included in an input range determining unit 62 and the comparator H15 is included in an offset varying unit 64.

Each of the adders H8, H10, H11 and H12 has a first and second inputs. The respective first inputs of all four adders are connected directly to the input H7 for receiving therefrom the m-bit logical register number r. The second input of the adder H8 is connected to an output of the register H3. The second input of the adder H10 is connected to an output of the counter H6.

The second input of the adder H11 is connected to an output of the counter H5. The second input of the adder H12 is connected to an output of the counter H4.

The multiplexer H100 has four m-bit inputs, two of which are connected directly to the input H7 for receiving the m-bit input value r (third candidate output value C3). The other two m-bit inputs to the multiplexer H100 are connected to respective outputs of the adders H11 (second candidate output value C2) and H12 (first candidate output value C1). The multiplexer H100 also has a selection input for receiving a two-bit selection signal S [s1, s0]. The bit s1 of the selection signal S is the most significant bit (bit m) of the output of adder H8. The bit s0 of the selection signal S is the most significant bit (bit m) of the output of the adder H10.

The comparator H15 has a first input connected to an output of the register H1 and a second input connected to an output of the counter H5. The offset varying unit 64 has an input connected for receiving a RENAME signal. The offset varying unit 64 also has an output connected to respective inputs of the counters H4 to H6 for applying selectively thereto either a reset signal RESET or a decrement signal DEC.

The register H1 has an output connected to an input of the counter H4, the register H2 has an output connected to an input of the counter H5, and the register H3 has an output connected to an input of the counter H6.

Operation of the register mapping circuitry shown in FIG. 12 will now be described.

The registers H1, H2 and H3 are used for storing the above-mentioned initialisation values $I_x$, $I_y$ and $I_x$ respectively. The counters H4, H5 and H6 are used for holding the above-mentioned count values x, y and w respectively.

At the start of operation (steps S1, S2 and S3 in FIG. 11), the registers H1, H2 and H3 are initialised respectively with the values $I_x$, $I_y$ and $I_w$ (the control logic for initialising these registers has been omitted from FIG. 2 for clarity). Next, the offset varying unit 64 applies the RESET signal to the counters H4, H5 and H6 so that they are loaded respectively with the values of $I_x$, $I_y$ and $I_w$ in steps S4, S5 and S6 (the above-mentioned "reset" operation).

When a new r-value (logical register number) is received at the input H7 (step S7) respective detection values $D1=I_w+r$ and $D2=w+r$ are computed concurrently by the adders H8 and H10 respectively (steps S8 and S10 respectively). In each case, the most significant bit (s1 for adder H8 and s0 for adder H10) of the detection value D1 or D2 indicates by itself whether that value is less than zero. If the detection value is less than zero, then the most significant bit is high (1); otherwise it is low (0).

The two bits s0 and s1 make up the selection signal S used to select one of the four inputs of the multiplexer H100. When [s1, s0]=[0, 0] input "00" is selected; when [s1, s0]=[0, 1] input "01" is selected; when [s1, s0]=[1, 0] input "10" is selected; and when [s1, s0]=[1, 1] input "11" is selected. At the four inputs three different candidate output values are available. The first candidate output value (input "00") is the value x+r produced by the adder H12. The second candidate output value (input "01") is the value y+r produced by the adder H11. The third candidate output value (inputs "10" and "11") is the r-value received at the input H7.

As the "10" and "11" inputs both receive the same candidate output value C3 (the input logical register number r), this value is selected as the output of the multiplexer H100 whenever the selection bit s1 is 1 (this indicates that the result D1 of the addition carried out by adder H8 is negative). This corresponds to the determination "YES" in step S8 of FIG. 11 ($I_w+r<0$), and the output physical register number p being set equal to the input logical register number r in step S9.

If [s1, s0]=[0, 1] then the second candidate output value C2 is selected as the output of the multiplexer H100, corresponding to a determination "NO" in step S8 ($I_w+r<0$) and a determination "YES" in step S10 (w+r<0).

If [s1, s0]=[0, 0] then the first candidate output value C1 is selected as the output of the multiplexer H100, corresponding to a determination "NO" in step S8 ($I_w+r\not<0$) and a determination "NO" in step S10 (w+r$\not<$0).

A rotation operation, for rotating the register mapping, is carried out in the FIG. 12 circuitry by the offset varying unit 64 in response to receipt of the control signal RENAME. In the rotation operation it is determined by the comparator H15 whether the count value y stored in the counter H5 is equal to the initialisation value $I_x$ held in the register H1. This corresponds to step S15 in FIG. 11. If the comparator H15 determines that $y=I_x$, then it produces the RESET signal and the counters H4, H5 and H6 are reloaded with the values stored in the registers H1, H2 and H3 respectively. This corresponds to the "reset" operation performed in the steps S4, S5 and S6 respectively.

If it is determined by the comparator H15 that the count value y in the counter H5 is not equal to the initialisation value $I_x$ in register R1, then the offset varying unit 64 produces the decrement control signal DEC. The values stored in registers H4, H5 and H6 are each decremented by one in response to the DEC signal, corresponding to steps S16, S17 and S18. In this way, the first, second and in-range offset values x, y and w are varied within the appropriate ranges whilst always maintaining the same differences between them.

It will be appreciated that in the FIG. 12 embodiment the addition operation required to produce the first candidate output value x+r is carried out by the adder H12 at the same time as the addition operation required to produce the second candidate output value y+r is carried out by the adder H11. For any given r-value in the range from $l^s$ to $l_e$ (allowable input-value range for mapping to the renamable space in the register file), one of the first and second candidate output values will be in the range from K to N−1 of allowable output values (physical register numbers in the renamable space) and the other candidate output value will be outside the range. The determination of which one of the two candidate output values is in-range is carried out in this embodiment by employing a further addition operation in which the in-range offset value w is added to the r-value to produce the detection value $D2=w+r$. Because $w=x-K=y-N$ at all times, it follows that w+r<0 when x+r<K and y+r<N, signifying that the first candidate output value x+r is out of range and the second candidate output value y+r is in range. Conversely, it follows that $w+r\geq 0$ when $x+r\geq K$ and $y+r\geq N$, signifying that the first candidate output value x+r is in range and the second candidate output value y+r is out of range. Assuming that w and r are in two-complement representation, the most significant bit (s0) only of the detection value D2 (w+r) is needed to identify-the in-range candidate output value, i.e. the determined in-range candidate output value,is the first candidate output value when s0=0 and is the second candidate output value when s0=1.

The third addition operation w+r used to produce the detection value D2 in this embodiment is independent of the operations to produce the first and second candidate output values. This third addition operation is therefore carried out at the same time as those operations. This means that the determination of the in-range candidate output value is not delayed until those two candidate values have been produced.

In the FIG. 12 embodiment the received r-value (third candidate output-value C3) is also selected when $r<l_s$. Similarly to the case of the determination of the in-range candidate output value, the determination whether $r<l_s$ is carried out by employing a fourth addition operation in which the w-initialisation value $I_w$ is added to the r-value to produce the detection value D1. Because $I_w=-l_s$ it follows that $I_w+r<0$ when $r<l_s$, signifying that the third candidate output value r should be selected. Conversely, it follows that $I_w+r\geq 0$ when $r\geq l_s$, signifying that one of the first and second candidate output values x+r and y+r should be selected. Assuming that $I_w$ and r are in twos-complement representation, the most significant bit (s1) only of the result $I_w+r$ is needed to determine whether or not to select the third candidate output value. Thus, it is determined that the first or second candidate output value should be selected when s1=0 and that the third candidate output value should be selected when s1=1.

The fourth addition operation $I_w+r$ used to produce the detection value D1 in this embodiment is independent of the operations to produce the first and second candidate output values and of the operation to determine the in-range one of those values. The fourth addition operation is therefore carried out at the same time as those other operations. This means that the production of the first and second candidate output values is not delayed by the operation to determine whether to select the third candidate output value, or vice versa.

The FIG. 12 implementation therefore uses four parallel adders and a 4-to-1 multiplexer to compute the output value r. The resulting logic requires only the amount of time necessary to complete the addition of two (m+1)-bit integers, and the time to select one of the four m-bit values. Therefore the critical path through the logic for computing the physical register number p corresponding to a logical register number r is one (short) integer addition and 1-of-4 selection. This represents a considerable time saving in comparison to the computation of a modulus operation.

In addition, the complete state of the register mapping is contained within the counters and registers H1 to H6 (offset values x, y, w and the initialisation values $I_x$, $I_y$ and $I_w$). When the mapping circuitry 60 is incorporated within a processor such as the FIG. 1 processor, therefore, saving the state of the processor requires only that the contents of these counters and registers are saved. They could be subsequently reloaded to restore the state of the register mapping. This demonstrates that the mechanism is practical for use in general-purpose processors where processors are periodically saved and restored to facilitate multi-processing operating systems.

The above-described example is for the case in which each offset value is decremented in order to rotate the register mapping. It will be appreciated that a similar method and circuitry can also be employed in a remapping scheme in which each offset value is incremented rather than being decremented.

An additional advantage achieved by an embodiment of the present invention is that the boundary between the dynamically and the statically addressed portions 120R and 120S of the physical register file 120 illustrated in FIG. 5 is programmable. The rotating region 120R of the physical register file can be placed at an arbitrary position within the name space of registers. The position of the boundary between the regions is programmed by the setting appropriately the output-range limit values K and/or N, and can be altered at any point during program execution simply by setting new values for K and/or N and returning processing back to step S1 in FIG. 11 such that new values for the registers H1, H2 and H3 ($I_x$, $I_y$ and $I_w$) are computed before the new mapping is computed.

Although the above description has related in the main to a method and circuitry for performing a fast mapping of register names in a microprocessor, it will be appreciated that such a method and circuitry could be used in any other applications where such a fast mapping from an input value to a corresponding output value is required.

It will also be appreciated that in a processor in which rotating register renaming is used the circumstances in which the registers are renamed are not limited to when a pipeline boundary is crossed. Renaming could be carried out under any suitable conditions appropriate for the processor.

It will also be appreciated that the detection values used to make the candidate output value selection need not be such that those values cross zero when the relevant selection criterion is met. Zero crossing is convenient when two-complement representation of the detection values is used. However, when an unsigned representation is used the same result can still be achieved by setting the offset value so that the detection value crosses a power-of-two value (e.g. $2^5=32$) when the relevant selection criterion is met. That way, a single preselected bit can be examined to identify when the criterion is met. That bit need not be the most significant bit.

What is claimed is:

1. Mapping circuitry for mapping an input value, within a preselected range of allowable input values, to a corresponding output value within a preselected range of allowable output values, said circuitry comprising:

a first candidate output value producing unit connected for receiving said input value and operable to produce a first candidate output value that differs by a first offset value from the received input value;

a second candidate output value producing unit connected for receiving said input value and operable, during operation of said first candidate output value producing unit to produce said first candidate output value, to produce a second candidate output value that differs by a second offset value from the received input value, the first and second offset values being such that a difference between them is equal to a difference between respective output-range limit values defining the limits of the preselected output-value range and such that, for any said input value within said preselected input-value range, one of the first and second candidate output values is within the preselected output-value range and the other of those two values is outside that range;

an in-range value determining unit operable to determine, during operation of one or both of said first and second candidate value producing units to produce said first and second candidate output values, which one of said first and second candidate output values is within said preselected output-value range; and an output value selection unit which selects as said corresponding output value that one of said first and second candidate output values which is determined to be within said output-value range.

2. Mapping circuitry as claimed in claim 1, further comprising:

an input range determining unit connected for receiving said input value and operable to determine whether said input value is within said preselected input-value range; and a third candidate output value producing unit which produces a third candidate output value;

wherein said output value selection unit is operable, when said input range determining unit determines that said input value is outside said preselected input-value range, to select as said corresponding output value said third candidate output value.

3. Mapping circuitry as claimed in claim 2, wherein said third candidate output value producing unit is connected for receiving said input value and said third candidate output value is dependent upon said input value.

4. Mapping circuitry as claimed in claim 3, wherein said third candidate output value is equal to said input value.

5. Mapping circuitry as claimed in claim 2, wherein said input range determining unit is operable to determine whether said input value is outside said preselected input-value range during operation of one or both of said first and second candidate value producing units to produce said first and second candidate output values.

6. Mapping circuitry as claimed in claim 2, wherein said third candidate output value producing unit is operable to produce said third candidate output value during operation of one or both of said first and second candidate value producing units to produce said first and second candidate output values.

7. Mapping circuitry as claimed in claim 1, wherein at least one of said output-range limit values is variable during operation of the circuitry.

8. Mapping circuitry as claimed in claim 1, wherein the span of the preselected output-value range is greater than the span of the preselected input-value range.

9. Mapping circuitry as claimed in claim 2, wherein said input range determining unit is operable to determine whether said input value is outside said preselected input-value range by producing a detection value that differs by a third offset value from the received input value, and detecting when a predetermined bit of the detection value has a predetermined logic value.

10. Mapping circuitry as claimed in claim 9, wherein said third offset value is set in dependence upon an input-range limit value defining one of the limits of the predetermined input-value range.

11. Mapping circuitry as claimed in claim 10, wherein the detection value is produced by adding the third offset value to the received input value.

12. Mapping circuitry as claimed in claim 9, wherein said predetermined bit is the most significant bit of the produced detection value.

13. Mapping circuitry as claimed in claim 1, further comprising an offset varying unit operable selectively to vary said first and second offset values during operation of the circuitry, whilst maintaining said difference between them.

14. Mapping circuitry as claimed in claim 1, wherein said in-range value determining unit is operable to produce a detection value that differs by an in-range offset value from the received input value, and to determine that the in-range output value is the first candidate output value when a preselected bit of the produced detection value has a first logic value and that the in-range output value is the second candidate output value when that bit has a second logic value.

15. Mapping circuitry as claimed in claim 14, wherein said in-range offset value differs from the first offset value by one of said output-range limit values and differs from the second offset value by the other of said output-range limit values.

16. Mapping circuitry as claimed in claim 14, further comprising an offset varying unit operable selectively to vary said first and second offset values during operation of the circuitry, whilst maintaining said difference between them, and wherein said offset varying unit also varies said in-range offset value when said first and second offset values are varied so as to leave unchanged the respective differences between the first and in-range offset values and between the second and in-range offset values.

17. Mapping circuitry as claimed in claim 14, wherein the in-range offset value is dependent upon an input-range limit value defining one of the limits of the preselected input-value range.

18. Mapping circuitry as claimed in claim 16, wherein the detection value is produced by adding the in-range offset value to the received input value.

19. Mapping circuitry as claimed in claim 14, wherein said preselected bit is the most significant bit of the produced detection value.

20. A processor comprising:
  an instruction issuing unit which issues instructions;
  at least one instruction executing unit which executes the issued instructions;
  a register file, having a plurality of physical registers; and
  mapping circuitry which maps an input value, within a preselected range of allowable input values, to a corresponding output value within a preselected range of allowable output values, said input value being a logical register identifier specified by one of said instructions, and said output value being physical register within said register file that corresponds to the specified logical register identifier;
  wherein said mapping circuitry comprises:
    a first candidate output value producing unit connected for receiving said input value and operable to produce a first candidate output value that differs by a first offset value from the received input value;
    a second candidate output value producing unit connected for receiving said input value and operable, during operation of said first candidate output value producing unit to produce said first candidate output value, to produce a second candidate output value that differs by a second offset value from the received input value, the first and second offset values being such that a difference between them is equal to a difference between respective output-range limit values defining the limits of the preselected output-value range and such that, for any said input value within said preselected input-value range, one of the first and second candidate output values is within the preselected output-value range and the other of those two values is outside that range;
    an in-range value determining unit operable to determine, during operation of one or both of said first and second candidate value producing units to produce said first and second candidate output values, which one of said first and second candidate output values is within said preselected output-value range; and
    an output value selection unit which selects as said corresponding output value that one of said first and second candidate output values which is determined to be within said output-value range.

21. A processor as claimed in claim 20, wherein said register file comprises a dynamically-named region and mapping-circuitry output values within the predetermined output-value range provide said physical register identifiers of those physical registers within said dynamically-named region.

22. A processor as claimed in claim 20, wherein said register file comprises a statically-named region and mapping-circuitry output values outside the predetermined output-value range provide said physical register identifiers of those physical registers within said statically-named region.

23. A mapping method for mapping an input value, within a preselected range of allowable input values, to a corresponding output value within a preselected range of allowable output values, said method comprising:
  producing a first candidate output value that differs by a first offset value from the received input value;
  producing, during production of said first candidate output value, a second candidate output value that differs by a second offset value from the received input value, the first and second offset values being such that a difference between them is equal to a difference between respective output-range limit values defining the limits of the preselected output-value range and such that, for any said input value within said preselected input-value range, one of the first and second candidate output values is within the preselected output-value range and the other of the two values is outside that range;
  determining, during production of one or both of said first and second candidate output values, which one of the first and second candidate output values is within said preselected output-value range; and
  selecting as said corresponding output value that one of said first and second candidate output values which is determined to be within said output-value range.

24. Mapping circuitry for mapping an input value, within a preselected range of allowable input values, to a corresponding output value within a preselected range of allowable output values, said circuitry comprising:
  first candidate output value producing means connected for receiving said input value and operable to produce a first candidate output value that differs by a first offset value from the received input value;

second candidate output value producing means connected for receiving said input value and operable, during operation of said first candidate output value producing means to produce said first candidate output value, to produce a second candidate output value that differs by a second offset value from the received input value, the first and second offset values being such that a difference between them is equal to a difference between respective output-range limit values defining the limits of the preselected output-value range and such that, for any said input value within said preselected input-value range, one of the first and second candidate output values is within the preselected output-value range and the other of those two values is outside that range;

in-range value determining means operable to determine, during operation of one or both of said first and second candidate value producing means to produce said first and second candidate output values, which one of said first and second candidate output values is within said preselected output-value range; and output value selection means for selecting as said corresponding output value that one of said first and second candidate output values which is determined to be within said output-value range.

\* \* \* \* \*